United States Patent [19]
Fitzpatrick

[11] Patent Number: 4,692,359
[45] Date of Patent: Sep. 8, 1987

[54] MAGNETIC APPLICATION OF LIGHT-ABSORBING PARTICLES TO A LENTICULAR SCREEN

[75] Inventor: Brian J. Fitzpatrick, Ossining, N.Y.

[73] Assignee: North American Philips Corporation, New York, N.Y.

[21] Appl. No.: 938,664

[22] Filed: Dec. 5, 1986

[51] Int. Cl.$^4$ ............................................. B05D 3/02
[52] U.S. Cl. ................................. 427/45.1; 350/127; 350/128; 350/126; 350/129; 430/42; 430/97
[58] Field of Search ............... 427/45.1; 350/127, 126, 350/128, 129; 430/42, 97

[56] References Cited

U.S. PATENT DOCUMENTS 4,533,764  3/1986  Bradley ............................ 350/128
4,605,283  8/1986  Stanton ............................ 350/127

Primary Examiner—Thurman K. Page
Assistant Examiner—L. R. Horne
Attorney, Agent, or Firm—Robert J. Kraus

[57] ABSTRACT

A method for selectively applying particles having cores of magnetically-permeable material and outer, fusible surfaces to a lenticular, light-transmissive screen, such as a projection television screen. The particles are selectively deposited in grooves between lenticules of the screen by magnetically attracting the particles to tips of a particle carrier sheet which positionally correspond with the grooves in the screen. The screen is then positioned underneath the carrier sheet, and the magnetic attractive force is reduced to effect release of the particles into the grooves of the screen. Microwave radiation is applied to the screen with the deposited particles, and the magnetically-permeable cores concentrate microwave energy dissipation in the particles and effect selective heating of the particles until their outer surfaces fuse to each other and to the screen.

10 Claims, 3 Drawing Figures

MAGNETIC APPLICATION OF LIGHT-ABSORBING PARTICLES TO A LENTICULAR SCREEN

CROSS REFERENCE TO RELATED APPLICATIONS

This application is filed concurrently with U.S. patent applications Ser. No. 06/938,665 and 06/938669 of the same inventor, which are hereby incorporated by reference.

BACKGROUND OF THE INVENTION

1. Field of the Invention

The invention relates to light-transmissive viewing screens, and in particular to lenticular screens having light-absorbing material disposed in grooves between the lenticules of the screen.

2. Description of the Prior Art

Light-transmissive viewing screens such as rear projection screens are commonly provided with integral lenticules or lens elements. These lens elements are shaped to collect image-forming light rays projected onto the rear side of the screen by one or more projection tubes, and to concentrate the rays to form a bright image at the peaks of lens elements on the front or viewing side of the screen.

It is well known that providing a coating of masking material in grooves between the light-emitting lens elements, to absorb ambient light, enhances image contrast. Examples of lenticular screens with such masking material are described in commonly-owned U.S. Pat. No. 4,605,283 to Douglas A. Stanton, which is hereby incorporated by reference. The Stanton patent recognizes the desirability of minimizing contact of the masking material with the screen surfaces defining the grooves. The masking material not only absorbs ambient light incident to the masked grooves at the viewing side of the screen, but also partially absorbs the image-forming light entering the lens elements from the rear of the screen, thereby attenuating the image-forming light eventually reaching the light-emitting peaks of the lens elements. This attenuation occurs wherever the masking material contacts the surface of a lens element, thereby locally increasing the critical angle for total internal reflection (TIR) of light rays striking the rear of the lens elements. As is explained in the Stanton patent, this increase of the critical angle decreases the range of angles from which image-forming light rays received at the rear of the screen will be totally reflected toward the light-emitting peaks of the respective lens elements. To minimize the total area of each lens element contacted by the masking material, thus minimizing the total surface area of the screen for which the TIR is reduced, the Stanton patent proposes that the masking material be provided in the form of a multiplicity of small light-absorbing particles. Each particle makes minimal contact (e.g. point contact) with the outer surface of the lens element against which it is disposed, and the particles are contained within each groove by a layer extending between respective sidewalls of the lens elements which define the groove.

Selective deposition of the light-absorbing masking particles into the grooves of a lenticular screen such as that disclosed in the Stanton patent can be achieved by reasonably simple methods. Any particles which land on the rounded peaks of the disclosed lens elements can be wiped or jarred off and tend to drop into the grooves. However, selective deposition is more difficult with screens having peaks with concave central portions, such as are described in U.S. Pat. No. 4,573,764 to Ralph H. Bradley, which is hereby incorporated by reference. With such screens it has been found difficult to keep the deposited particles out of the concave portions of the peaks. It has also been found difficult to achieve uniform filling of the grooves with the particles. Both of these objectives must be achieved in order to ensure high brightness and high contrast of images formed on the screen.

Another problem experienced is associated with retaining the particles in the grooves without damaging the screen. In the Stanton screen masking arrangement, the layer containing the particles in each groove is preferably formed by heating the face of the screen until the uppermost particles in each groove fuse together. There is only a small margin of error between applying sufficient heat energy to fuse the uppermost particles into a layer and overheating the screen material (typically a plastic material such as polymethyl methacrylate) and causing optical distortion of the lenticules.

SUMMARY OF THE INVENTION

It is an object of the invention to provide a simple but effective method for selectively applying light-absorbing masking particles to the grooves of a light-transmissive, lenticular screen.

It is a further object of the invention to provide such a method which both minimizes the deposition of the particles on the light-emitting peaks and which effects uniform coating of the groove areas to be masked.

It is yet another object of the invention to securely affix the particles to the screen while both minimizing contact of the particles with the screen and preventing excessive heating of the screen.

In accordance with the invention, these and other objects are achieved by magnetically guiding the particles to the grooves and then affixing the particles without applying heat to the screen. The particles utilized each consist essentially of a magnetically-permeable material and have heat-fusible outer surfaces. In a preferred embodiment, the particles are toner particles used in electrophotographic copying machines. Typically, such particles have an inner core of magnetically-permeable material, and are covered with an outer layer of heat-fusible, light-absorbing material. A substantial quantity of these particles is guided to the grooves by magnetically attracting the particles to magnetically-permeable projection tips on a carrier sheet which are spaced to positionally correspond with the grooves in the screen. These tips are then proximately disposed with respect to the grooves, and the magnetic attraction is reduced to effect release of a quantity of the particles into the grooves. The particles are affixed by selectively heating them until they fuse to each other and to points of contact with the lenticule sidewalls.

Preferably, the projections of the carrier sheet have tips which are coated with magnetically-permeable material. A magnetic field is applied to the tips while the carrier sheet is disposed near a supply of the particles, and the magnetic field is maintained at a sufficient strength to retain the particles until the sheet is disposed in proximity to the screen such that the tips are opposite respective ones of the grooves. After the particles are released into the grooves, they are affixed to the screen by transfusing the screen and the particles with microwave radiation of sufficient energy to fuse the particles to each other and to the screen. This radiation selectively heats the particles because the magnetically-permeable material in the particles has a microwave absorption coefficient which is substantially higher than that of the screen material. Conversely, the screen absorbs relatively little of the microwave energy, and is not sufficiently heated to effect distortion of the lenticules.

BRIEF DESCRIPTION OF THE DRAWING

The invention will now be described with reference to exemplary drawing figures, of which.

DESCRIPTION OF THE PREFERRED EMBODIMENT

Figure 1:
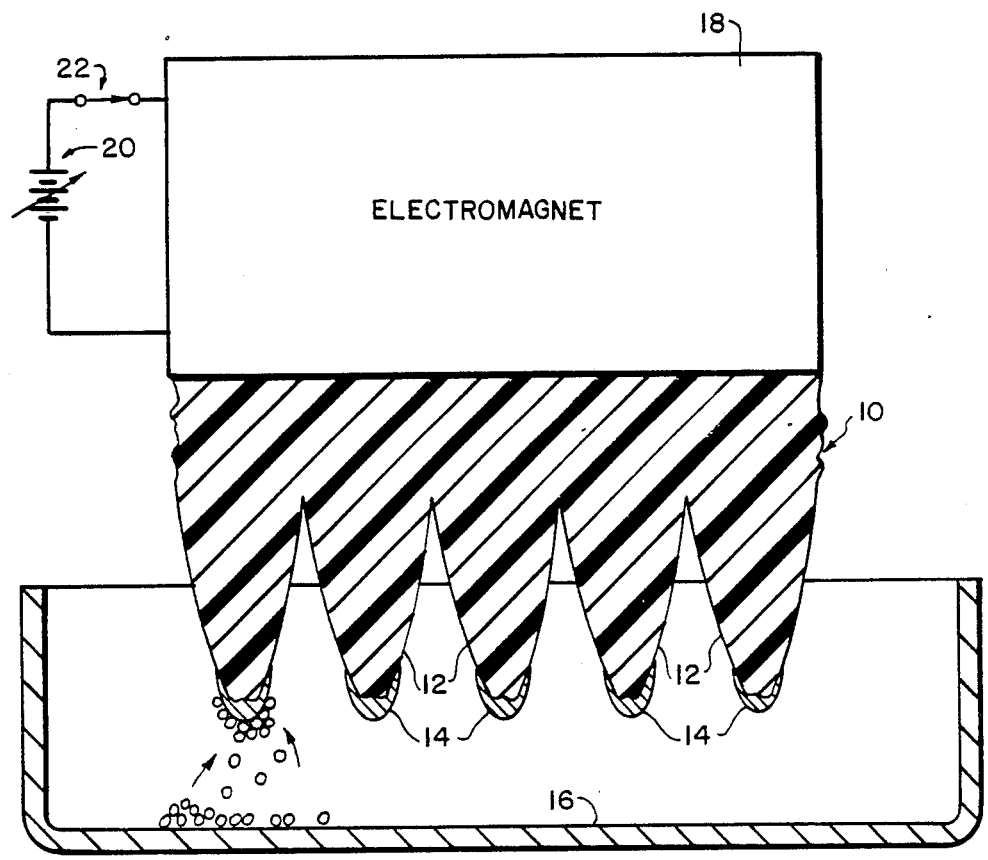
FIG. 1 illustrates the magnetic attraction of light-absorbing particles to the tips of a carrier sheet.

FIG. 1 illustrates a preferred technique for attracting the light-absorbing particles to the tips of the carrier sheet. In accordance with this technique, a carrier sheet 10 with a multiplicity of projections 12 having tips coated with magnetically-permeable material 14 is disposed above a supply of the particles contained within a receptacle 16. The tips of the projections must be shaped and spaced to substantially correspond with the grooves of the screen to be masked. This can be easily achieved by making the carrier sheet from a replica of the plastic screen and depositing on the lens peaks of the replica a coating of a soft (i.e. easily magnetized/demagnetized) magnetically permeable material. A suitable material is nickel, or more preferably a nickel alloy such as that sold under the trademark PERMALLOY, which consists of about 80% nickel and 20% iron, by weight. Alternatively, an alloy having even lower hysteresis loss may be utilized, such as the nickel alloy sold under the trademark SUPERMALLOY which consists of 79% nickel, 16% iron, and 5% molybdenum, by weight.

A wide range of suitable particle sizes and compositions is available for deposition, as is described in the above-mentioned U.S. Patent No. 4,605,283 to Stanton. Especially suitable for deposition into the grooves of a typical lenticular screen having peak-to-peak spacing of approximately 300 microns are relatively-large particles, such as 70 micron diameter particles available from 3M Company of St. Paul, Minn. under part number 50814-55. These particles have sufficient magnetically-permeable material to effect strong magnetic attraction to the coated tips of the carrier sheet in the presence of a magnetic field, have sufficient mass to effect separation from the tips when the magnetic field strength is intentionally reduced, and make relatively few points of contact with the side walls of the screen lenticules, thus minimally influencing TIR.

Magnetic attraction of the particles to the coated tips of the carrier sheet is effected by means of an electromagnet 18 attached to the back side of the carrier sheet 10. The electromagnet can be readily constructed from a plurality of side-by-side electromagnetic chucks such as those available from McMaster-Carr Supply Co. of New Brunswick, N.J. in a variety of sizes. DC power is applied to the electromagnet by means of an adjustable-voltage DC source 20 through a switch 22 in series with the DC source. An adjustable 0–115 volts DC source especially adapted for use with the above-mentioned electromagnetic chucks is also available from McMaster-Carr Supply Co.

Particles are attracted to the tips 14 from the receptacle 16 by closing the switch 22 to effect production by the electromagnet 18 of a magnetic field. To simplify the drawing, only one tip is shown attracting particles, but in the actual process all tips attract particles from adjacent regions of the receptacle 16.

The electromagnet is oriented such that the magnetic field lines pass through the plastic carrier sheet 10 and the receptacle 16, with the field lines being concentrated by the magnetically-permeable material coating the tips 14. The quantity of particles attracted to the tips is controlled by adjusting the voltage produced by the DC source 20. This quantity need not be sufficient to fill the grooves of a screen to the desired level, because more than one transfer of particles from the tips to the grooves can be performed.

Figure 2:
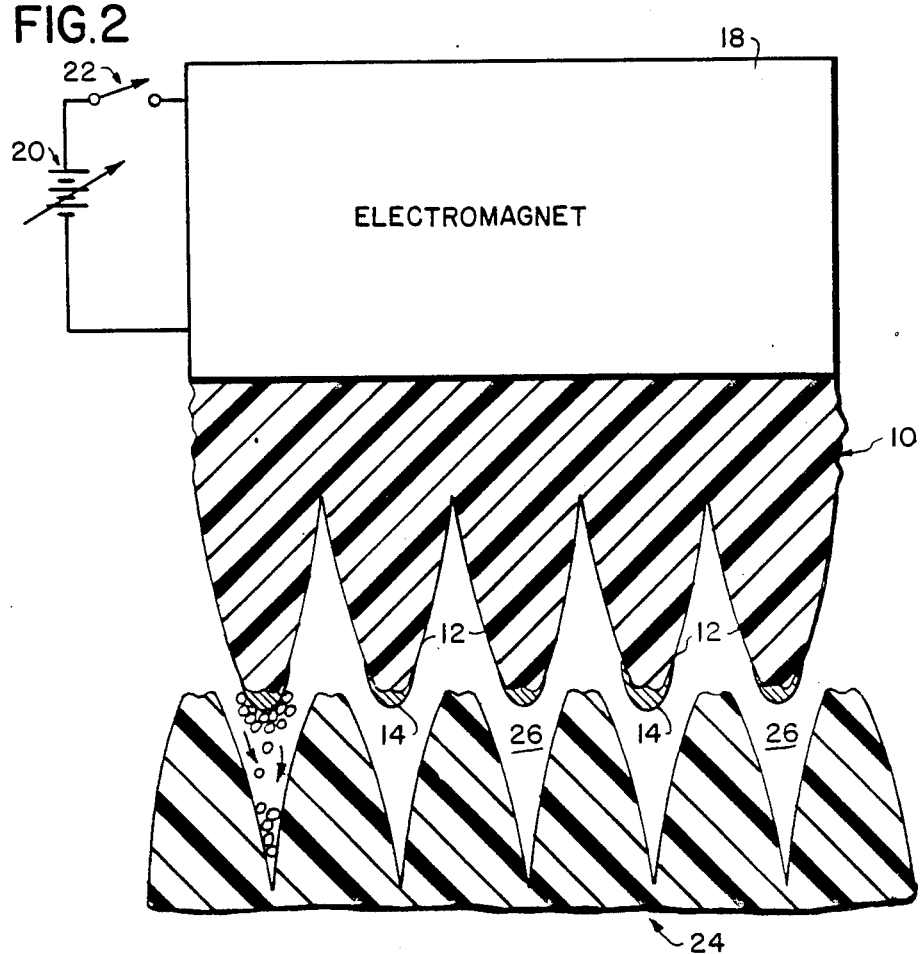
FIG. 2 illustrates selective deposition of the light-absorbing particles into grooves between lenticule peaks of a screen.

After attracting the particles to the tips, the carrier sheet is positioned above the screen to enable deposition of the particles into the grooves, as is illustrated in FIG. 2. This positioning can most conveniently be accomplished by moving the screen 24 to be masked underneath the carrier sheet 10 such that the coated tips 14 are proximately disposed above respective grooves 26 of the screen. The switch 22 is then opened to instantaneously reduce to zero the strength of the magnetic field produced by the electromagnet 18, thereby effecting a sudden release of the particles from the tips 14 into the grooves 26. Any residual magnetism which inhibits release of the particles may be counteracted by vibrating the carrier sheet 10. (Only one tip is shown as depositing particles, but in the actual process all of the tips release particles into respective grooves.)

Alternatively, release of the particles from the tips can be achieved in a controlled fashion by leaving the switch 22 in its closed position and adjusting the DC output voltage from source 20 to gradually reduce the magnetic field strength until a desired quantity of the particles falls into the grooves. This may be done with or without vibration of the carrier sheet. Ultimately, the quantity of particles deposited should fill the grooves to a predefined level which is determined by the optical design characteristics of the particular screen.

Figure 3:
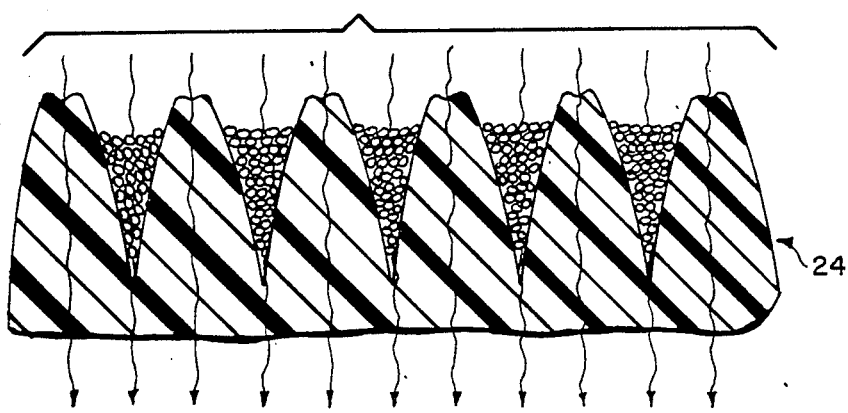
FIG. 3 illustrates heating of the deposited particles by microwave radiation.

After deposition of the particles in the grooves, the screen is moved to an affixing station, as is illustrated in FIG. 3. At this station, the screen and the particles in the grooves are transfused with microwave radiation of sufficient energy to fuse the particles to each other and to the screen, without optically distorting the lenticules. The energy expended will depend on the size of the screen, the particle diameters, and the relative arrangement of the microwave source and the screen.

In a test of the microwave heating step, particles were deposited in the grooves of a 4.0 cm×3.7 cm screen by simply dropping the particles onto the screen and wiping off any particles landing on the peaks, as is disclosed in the Stanton patent. The particles had a diameter of about 75 microns and were obtained from 3M Company under part number 50814-55. The deposited particles were optimally heated to fusion in a NORELCO Model 7100 microwave oven which was operated at 650 watts of microwave output power for four minutes. When heated for less than three minutes there was insufficient fusion of the particles to securely affix them in the grooves. When heated for over four minutes the particles tended to lose their spherical shape and made contact with substantial areas of the lenticule side walls, thereby adversely affecting TIR.

Although the invention has been described with reference to a particular embodiment, numerous modifications can be made without departing from the scope of the invention, as is set forth in the appended claims. For example, other types of particles could be used, such as particles formed from a mixture of plastic material and high magnetic permeability material. Also, an adjustable-strength permanent magnet structure may be used in place of the electromagnet described in conjunction with FIGS. 1 and 2. Such a permanent magnet structure can be readily constructed from a plurality of side-by-side permanent magnetic chucks, which are also available from McMaster-Carr Supply Co. in a variety of sizes. These chucks are provided with means for positionally adjusting internal magnets to adjust the strengths of the magnetic fields applied to the tips of the carrier sheet.

I claim:

1. A method for selectively applying light-absorbing particles to a light-transmissive screen having a surface contoured to include a a multiplicity of raised lenticules having respective peaks and sidewalls, said sidewalls defining grooves between the lenticules, said method comprising the steps of:
   (a) disposing near a supply of the light-absorbing particles a carrier sheet comprising a multiplicity of projections having tips including magnetically-permeable material, said tips being shaped and spaced to positionally correspond with the grooves in the screen, said particles consisting essentially of a magnetically-permeable material and having heat-fusible outer surfaces;
   (b) applying a magnetic field to the tips to effect attraction thereto of a substantial quantity of the particles;
   (c) continuing to apply the magnetic field while positioning the sheet and the screen such that the tips are proximately disposed with respect to the grooves;
   (d) reducing the strength of the magnetic field applied to the tips to a magnitude below that needed to maintain attraction of the particles to the tips, thereby effecting release of a substantial quantity of the particles from the tips and into the respective grooves to mask predefined portions of the sidewalls; and
   (e) transfusing the screen and the particles in the grooves with microwave radiation of sufficient energy to fuse the particles to each other and to the screen, but of insufficient energy to optically distort the screen material.

2. A method for selectively applying light-absorbing particles to a light-transmissive screen having a surface contoured to include a a multiplicity of raised lenticules having respective peaks and sidewalls, said sidewalls defining grooves between the lenticules, said method comprising the steps of:
   (a) disposing particle attraction means near a supply of the light-absorbing particles, said particles consisting essentially of a magnetically-permeable material and having heat-fusible outer surfaces, said particle attraction means comprising:
      (1) a carrier sheet comprising a multiplicity of projections having tips including magnetically-permeable material, said tips being shaped and spaced to enable their proximate positioning with respect to the grooves of the screen; and
      (2) means for applying a variable-strength magnetic field to the tips of the projections;
   (b) increasing the strength of the applied magnetic field to a magnitude sufficient to attract to the tips a predetermined quantity of the particles;
   (c) continuing to apply the magnetic field while disposing the sheet in proximity to the screen such that the tips are opposite respective ones of the grooves;
   (d) reducing the strength of the magnetic field applied to the tips to a magnitude below that needed to maintain attraction of the particles to the tips, thereby effecting release of a substantial quantity of the particles from the tips and into the respective grooves to mask predefined portions of the sidewalls; and
   (e) transfusing the screen and the particles in the grooves with microwave radiation of sufficient energy to fuse the particles to each other and to the screen, but of insufficient energy to optically distort the screen material.

3. A method as in claim 1 or 2 where the carrier sheet is a replica of the screen.

4. A method as in claim 1 or 2 where the sheet is disposed above the screen before releasing the particles and the released particles are influenced to move from the tips into the respective grooves by the force of gravity.

5. A method as in claim 1 or 2 where the lenticule peaks have concave central portions.

6. A method as in claim 1 or 2 where, during release of the particles from the tips, the carrier sheet is vibrated to promote said release.

7. A method as in claim 1 or 2 where the particles have a nominal diameter between 25 and 150 microns.

8. A method as in claim 1 or 2 where the magnetically-permeable material of the tips consists essentially of a nickel alloy.

9. A method as in claim 8, where the nickel alloy consists essentially of 80% nickel and 20% iron, by weight.

10. A method as in claim 1 or 2 where the particles comprise inner, magnetically-permeable cores surrounded by outer, heat-fusible light-absorbing coatings.

* * * * *